United States Patent
De Palo et al.

(10) Patent No.: US 11,840,775 B2
(45) Date of Patent: *Dec. 12, 2023

(54) FIBER COMPRISING PROPYLENE ETHYLENE RANDOM COPOLYMER

(71) Applicant: BASELL POLIOLEFINE ITALIA S.R.L., Milan (IT)

(72) Inventors: Roberto De Palo, Ferrara (IT); Davide Tartari, Ferrara (IT); Monica Galvan, Ferrara (IT); Claudio Cavalieri, Ferrara (IT); Isabella Maria Vittoria Camurati, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 133 days.

This patent is subject to a terminal disclaimer.

(21) Appl. No.: 17/617,325

(22) PCT Filed: May 26, 2020

(86) PCT No.: PCT/EP2020/064488
§ 371 (c)(1),
(2) Date: Dec. 8, 2021

(87) PCT Pub. No.: WO2020/249386
PCT Pub. Date: Dec. 17, 2020

(65) Prior Publication Data
US 2022/0228298 A1    Jul. 21, 2022

(30) Foreign Application Priority Data
Jun. 11, 2019  (EP) .................................. 19179504

(51) Int. Cl.
*D01F 6/30*    (2006.01)
*C08F 210/06*  (2006.01)
*D01F 8/06*    (2006.01)

(52) U.S. Cl.
CPC .............. *D01F 6/30* (2013.01); *C08F 210/06* (2013.01); *D01F 8/06* (2013.01); *C08F 2800/20* (2013.01)

(58) Field of Classification Search
CPC .. D04H 1/4382; D04H 1/43828; D04H 1/541; D04H 1/5412; D01F 6/30; D01F 8/06; C08F 210/06; C08F 2800/20
See application file for complete search history.

(56) References Cited

U.S. PATENT DOCUMENTS 11,186,664 B2 * 11/2021 Massari ............... C08F 2/34
2005/0244638 A1  11/2005 Chang et al.
2013/0323996 A1 * 12/2013 Maehara ............... D01F 6/04
                                                    525/185
2015/0307700 A1 * 10/2015 Destro ................. C08L 23/16
                                                    525/240
2017/0190893 A1 *  7/2017 Massari ............... C08L 23/142
2018/0291528 A1 * 10/2018 Scholl ................. D02J 1/223
2019/0211119 A1 *  7/2019 Wang .................. C08F 4/65912
2019/0338113 A1 * 11/2019 Galvan ................ C08L 23/20

FOREIGN PATENT DOCUMENTS

| CN | 1969068 A | 5/2007 |
| CN | 105579628 A | 5/2016 |
| CN | 108779307 A | 11/2018 |
| WO | 2005090655 A1 | 9/2005 |
| WO | 2018177952 A1 | 10/2018 |

OTHER PUBLICATIONS

S. Misra et al.: "Influence of molecular weight distribution on the structure and properties of melt-spun polypropylene filaments", Journal of Applied Polymer Science, vol. 56, No. 13, Jun. 27, 1995 (Jun. 27, 1995), pp. 1761-1779, XP055641013, US ISSN: 0021-8995, DOI: 10.1002/app.1995.070561307 p. 1762, cols. 1,2; tables I, II, III.

J. Tochcek et al.: "Processing stability of polypropylene impact-copolymer during multiple extrusion Effect of polymerization technology", Polymer Degradation and Stability, Barking, GB, vol. 96, No. 4, Jan. 12, 2011 (Jan. 12, 2011), pp. 491-498, XP028365389, ISSN: 0141-3910, DOI: 10.1016/J. Polymdegradstab.2011.01.08 [retrieved on Jan. 26, 2011] Part 2. Experimental; figure 1; table 1.

International Search Report and Written Opinion dated Jul. 21, 2020 (Jul. 21, 2020) For Corresponding PCT/EP2020/064488.

* cited by examiner

*Primary Examiner* — Jeremy R Pierce

(57) ABSTRACT

A fiber of a propylene ethylene copolymer having:
- i) xylene soluble fraction at 25° C. ranging from 14 wt % to 27 wt %;
- ii) intrinsic viscosity of the fraction soluble in xylene at 25° C. ranging from 1.0 to 2.4 dl/g;
- iii) melt flow rate, MFR, ranging from 12 g/10 min to 60 g/10 min;
- iv) an ethylene derived units content ranging from 5.0 wt % to 12.0 wt %;
- v) the ethylene derived units content of the fraction insoluble in xylene at 25° C. ranging from 2.5 wt % to 6.0 wt %;
- vi) the ethylene derived units content of the fraction soluble in xylene at 25° C. ranging from 15.2. wt % to 30.2 wt %
- vii) $C^{13}$ NMR sequences PEP measured on the fraction insoluble in xylene at 25° C. ranging from 3.5 mol % to 5.5 mol %; and
- viii) the $C^{13}$ NMR sequences PEP measured on the fraction soluble in xylene at 25° C. ranging from 11.0 mol % to 14.2 mol %.

15 Claims, No Drawings

FIBER COMPRISING PROPYLENE ETHYLENE RANDOM COPOLYMER

This application is the U.S. National Phase of PCT International Application PCT/EP2020/064488, filed May 26, 2020, claiming benefit of priority to European Patent Application No. 19179504.6, filed Jun. 11, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to fibers made from or containing a propylene ethylene random copolymer.

BACKGROUND OF THE INVENTION

In some instances, nonwoven webs or fabrics are used in products such as workwear, workwear materials, garments, disposable diapers, and other personal hygiene products, including pre-moistened wipes. Disposable absorbent garments include diapers, incontinence briefs, training pants, and feminine hygiene products. In some instances, nonwoven webs are selected for strength, softness, and abrasion resistance SUMMARY OF THE INVENTION In a general embodiment, the present disclosure provides a fiber made from or containing a propylene ethylene copolymer having:
  i) a xylene soluble fraction at 25° C. ranging from 14 wt % to 27 wt %, based upon the total weight of the propylene ethylene copolymer;
  ii) an intrinsic viscosity of the fraction soluble in xylene at 25° C. ranging from 1.0 to 2.4 dl/g;
  iii) a melt flow rate, MFR, measured according to ISO 1133 at 230° C. with a load of 2.16 kg, ranging from 12 g/10 min to 60 g/10 min;
  iv) an ethylene derived units content ranging from 5.0 wt % to 12.0 wt %, based upon the total weight of the propylene ethylene copolymer;
  v) the ethylene derived units content of the fraction insoluble in xylene at 25° C. ranging from 2.5 wt % to 6.0 wt %;
  vi) the ethylene derived units content of the fraction soluble in xylene at 25° C. ranging from 15.2 wt % to 30.2 wt %;
  vii) $C^{13}$ NMR sequences PEP measured on the fraction insoluble in xylene at 25° C. ranging from 3.5 mol % to 5.5 mol %; and
  viii) $C^{13}$ NMR sequences PEP measured on the fraction soluble in xylene at 25° C. ranging from 11.0 mol % to 14.2 mol %.

DETAILED DESCRIPTION OF THE INVENTION

In some embodiments, the present disclosure provides a fiber made from or containing a propylene ethylene copolymer having:
  i) a xylene soluble fraction at 25° C. ranging from 14 wt % to 27 wt %; alternatively from 17 wt % to 25 wt %; alternatively from 18 wt % to 22 wt %, based upon the total weight of the propylene ethylene copolymer;
  ii) an intrinsic viscosity of the fraction soluble in xylene at 25° C. ranging from 1.0 to 2.4 dl/g; alternatively from 1.5 to 2.2 dl/g; alternatively from 1.7 to 2.1 dl/g;
  iii) a melt flow rate, MFR, measured according to ISO 1133 at 230° C. with a load of 2.16 kg, ranging from 12.0 g/10 min to 60.0 g/10 min; alternatively from 15.0 g/10 min to 50.0 g/10 min; alternatively from 18.6 g/10 min to 30.0 g/10 min;
  iv) an ethylene derived units content ranging from 5.0 wt % to 12.0 wt %, alternatively from 6.2 wt % to 10.3 wt %, based upon the total weight of the propylene ethylene copolymer;
  v) the ethylene derived units content of the fraction insoluble in xylene at 25° C. ranging from 2.5 wt % to 6.0 wt %; alternatively ranging from 3.2 wt % to 5.2 wt %; alternatively ranging from 3.5 wt % to 5.0 wt %;
  vi) the ethylene derived units content of the fraction soluble in xylene at 25° C. ranging from 15.2. wt % to 30.2 wt %; alternatively ranging from 17.2 wt % to 24.8 wt %; alternatively ranging from 18.2 wt % to 22.8 wt %;
  vii) $C^{13}$ NMR sequences PEP measured on the fraction insoluble in xylene at 25° C. ranging from 3.5 mol % to 5.5 mol %; alternatively ranging from 3.8 mol % to 5.2 mol %; alternatively ranging from 3.9 mol % to 4.8 mol %; and
  viii) $C^{13}$ NMR sequences PEP measured on the fraction soluble in xylene at 25° C. ranging from 11.0 mol % to 14.2 mol %; alternatively ranging from 11.5 mol % to 13.8 mol %; alternatively ranging from 12.3 mol % to 13.5 mol %.

As used herein, the term "copolymer" refers to polymers containing two kinds of comonomers. In some embodiments, the comonomers are propylene and ethylene.

In some embodiments and in the propylene ethylene copolymer, the $C^{13}$ NMR sequences PEE measured on the fraction soluble in xylene at 25° C. range from 7.2 mol % to 12.0 mol %; alternatively from 8.3 mol % to 11.2 mol %.

In some embodiments and in the propylene ethylene copolymer, the $C^{13}$ NMR sequences EEE measured on the fraction soluble in xylene at 25° C. are lower than 6.5 mol % alternatively in a range from 5.9 mol % to 2.0 mol %.

In some embodiments and in the propylene ethylene copolymer, the product of reactivity ratio r1r2 of the fraction insoluble in xylene at 25° C. measured with $C^{13}$ NMR is between 2.4 and 4.6; alternatively between 2.9 and 4.1; alternatively between 3.1 and 3.8.

Propylene ethylene copolymer is obtained with a process being carried out in a reactor having two interconnected polymerization zones, a riser and a downcomer, wherein the growing polymer particles:
  (a) flow through the first polymerization zone, the riser, under fast fluidization conditions in the presence of propylene and ethylene;
  (b) leave the riser and enter the second polymerization zone, the downcomer, through which the growing polymer particles flow downward in a densified form in the presence of propylene and ethylene, wherein the concentration of ethylene in the downcomer is higher than in the riser; and
  (c) leave the downcomer and are reintroduced into the riser, thereby establishing a circulation of polymer between the riser and the downcomer.

In the first polymerization zone (riser), fast fluidization conditions are established by feeding a gas mixture made from or containing one or more alpha-olefins at a velocity higher than the transport velocity of the polymer particles. In some embodiments, the velocity of the gas mixture is between 0.5 and 15 m/s, alternatively between 0.8 and 5 m/s. As used herein, the terms "transport velocity" and "fast fluidization conditions" are as defined in "D. Geldart, Gas Fluidisation Technology, page 155 et seq., J. Wiley & Sons Ltd., 1986".

In the second polymerization zone (downcomer), the polymer particles flow under the action of gravity in a densified form, thereby achieving the high values of density of the solid (mass of polymer per volume of reactor) and approaching the bulk density of the polymer. As used herein, the term "densified form" of the polymer indicates that the ratio between the mass of polymer particles and the reactor volume is higher than 80% of the "poured bulk density" of the polymer. In the downcomer, the polymer flows downward in a plug flow and small quantities of gas are entrained with the polymer particles.

In some embodiments, the two interconnected polymerization zones are operated such that the gas mixture coming from the riser is totally or partially prevented from entering the downcomer by introducing into the upper part of the downcomer a liquid or gas stream, denominated "barrier stream", having a composition different from the gaseous mixture present in the riser. In some embodiments, one or more feeding lines for the barrier stream are placed in the downcomer close to the upper limit of the volume occupied by the polymer particles flowing downward in a densified form.

In some embodiments, this liquid/gas mixture fed into the upper part of the downcomer partially replaces the gas mixture entrained with the polymer particles entering the downcomer. The partial evaporation of the liquid in the barrier stream generates in the upper part of the downcomer a flow of gas, which moves counter-currently to the flow of descending polymer, thereby acting as a barrier to the gas mixture coming from the riser and entrained among the polymer particles. In some embodiments, the liquid/gas barrier fed to the upper part of the downcomer is sprinkled over the surface of the polymer particles. In some embodiments, the evaporation of the liquid provides the upward flow of gas.

In some embodiments, the feed of the barrier stream causes a difference in the concentrations of monomers or hydrogen (molecular weight regulator) inside the riser and the downcomer, thereby producing a bimodal polymer.

In some embodiments, the gas-phase polymerization process involves a reaction mixture made from or containing the gaseous monomers, inert polymerization diluents and chain transfer agents to regulate the molecular weight of the polymeric chains. In some embodiments, hydrogen is used to regulate the molecular weight. In some embodiments, the polymerization diluents are selected from $C_2$-$C_8$ alkanes, alternatively from the group consisting of propane, isobutane, isopentane and hexane. In some embodiments, propane is used as the polymerization diluent in the gas-phase polymerization.

In some embodiments, the barrier steam is made from or containing:
  i. from 10 to 100% by mol of propylene, based upon the total moles in the barrier stream;
  ii. from 0 to 80% by mol of ethylene, based upon the total moles in the barrier stream;
  iii. from 0 to 30% by mol of propane, based upon the total moles in the barrier stream;
  iv. from 0 to 5% by mol of hydrogen, based upon the total moles in the barrier stream.

In some embodiments, the composition of the barrier stream is obtained from the condensation of a part of the fresh monomers and propane, wherein the condensed part is fed to the upper part of the downcomer in a liquid form. In some embodiments, the composition of the barrier stream is derived from condensation or distillation of part of a gaseous stream continuously recycled to the reactor having two interconnected polymerization zones.

In some embodiments, additional liquid or gas is fed along the downcomer at a point below the barrier stream.

In some embodiments, the recycle gas stream is withdrawn from a gas/solid separator placed downstream the riser, cooled by passage through an external heat exchanger and then recycled to the bottom of the riser. In some embodiments, the recycle gas stream is made from or containing the gaseous monomers, the inert polymerization components, and chain transfer agents. In some embodiments, the inert polymerization components include propane. In some embodiments, the chain transfer agents include hydrogen. In some embodiments, the composition of the barrier stream deriving from condensation or distillation of the gas recycle stream is adjusted by feeding liquid make-up monomers and propane before the gas recycle stream's introduction into the upper part of downcomer. In some embodiments and in both riser and downcomer, the temperature is between 60° C. and 120° C., while the pressure ranges from 5 to 40 bar.

In some embodiments, the process for preparing the propylene ethylene copolymer is carried out in presence of a highly stereospecific heterogeneous Ziegler-Natta catalyst. In some embodiments, the Ziegler-Natta catalysts are made from or containing a solid catalyst component made from or containing at least one titanium compound having at least one titanium-halogen bond and at least an electron-donor compound (internal donor), both supported on magnesium chloride. In some embodiments, the Ziegler-Natta catalysts systems are further made from or containing an organo-aluminum compound as a co-catalyst and optionally an external electron-donor compound.

In some embodiments, the catalysts systems are as described in the European Patent Nos. EP45977, EP361494, EP728769, and EP 1272533 and Patent Cooperation Treaty Publication No. WO00163261.

In some embodiments, the organo-aluminum compound is an alkyl-Al selected from the trialkyl aluminum compounds. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the trialkylaluminum is mixed with alkylaluminum halides, alkylaluminum hydrides or alkylaluminum sesquichlorides such as $AlEt_2Cl$ and $Al_2Et_3Cl_3$.

In some embodiments, the external electron-donor compounds are selected from the group consisting of silicon compounds, ethers, esters, amines, heterocyclic compounds, ketones and 1,3-diethers. In some embodiments, the ester is ethyl 4-ethoxybenzoate. In some embodiments, the external electron-donor compound is 2,2,6,6-tetramethyl piperidine. In some embodiments, the external donor compounds are silicon compounds of formula $R_a^5R_b^6Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compounds are selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-methyldimethoxysilane. In some embodiments, the external electron donor compound is used in an amount to give a molar ratio between the organo-aluminum compound and the electron donor compound of from 0.1 to 500; alternatively from 1 to 100; alternatively from 2 to 50.

In some embodiments, propylene ethylene copolymer compositions are further made from or containing additives and/or peroxides, thereby achieving a certain Melt Flow Rate.

In some embodiments, the additives are made from or containing pigments, opacifiers, fillers, stabilizers, flame retardants, antacids and whiteners.

In some embodiments, fibers are made from or containing the propylene ethylene copolymer by melt-spinning the polyolefin composition to produce single or composite fibers or filaments.

In some embodiments, the composite fibers or filaments have a "skin-core structure".

As used herein, the phrase "fibers or filaments having a skin-core structure" refers to fibers or filaments having an axially extending interface and made from or containing at least two components, that is, at least an inner core and at least an outer skin. In some embodiments, the components are made from or containing different polymeric materials and are joined along the axially extending interface. In some embodiments and in skin-core fibers or filaments, the skin thickness is uniform or is not uniform around the circumference of the fiber or filament cross-section.

In some embodiments, fibers or filaments having skin-core structure are produced using melt-spin equipment having eccentric or concentric annular dies. In some embodiments, the present propylene ethylene copolymer is used for producing the core or the skin of fibers or filaments having a skin-core structure. In some embodiments, the present propylene ethylene copolymer is used for producing both the core and the skin structure. In some embodiments, the inner core and the outer skin layer is made from or containing other polymeric material used for spunbond applications. In some embodiments, the skin-core fibers or filaments are made from or containing 50-80% by weight, alternatively 55-75% by weight, of other polymeric material forming the core-layer and 20-50% by weight, alternatively 25-45% by weight, of polymer material made from or containing the present propylene ethylene copolymer, forming the outer skin-layer, with respect to the total weight of the fibers or filaments. In some embodiments, the outer skin layer and the inner core of the fibers or filaments having a skin-core structure are made from or containing the propylene ethylene copolymer.

In some embodiments, the fibers have a diameter of 10 to 50 micrometers.

In some embodiments, the fibers are spread to form directly a fiber web and calendered, thereby obtaining a non-woven fabric.

In some embodiments and in a spunbonding process, the polymer is heated in an extruder to the melting point of the polyolefin composition and then the molten polyolefin composition is pumped under pressure through a spinneret containing a number of orifices of certain diameter, thereby producing filaments of the molten polymer composition and without subjecting the filaments to a subsequent drawing.

In some embodiments, the equipment includes an extruder with a die on the extruder's spinning head, a cooling tower, and an air suction gathering device that uses Venturi tubes.

In some embodiments, the filaments are gathered over a conveyor belt, where the filaments are distributed and thereby forming a web.

In some embodiments, the spunbond machinery is used under the following process conditions:
the output per hole ranges from 0.3-0.8 g/min, alternatively from 0.4-0.6 g/min;
the molten polymer filaments fed from the face of the spinneret are cooled by air flow and solidified as a result of cooling; and
the spinning temperature is between 200° and 300° C.

The filaments are brought by a conveyor belt to a thermal bonding step, which is carried out by calendering through a couple of heated rolls. In some embodiments, the thermal bonding temperatures range from 120° C. to 170° C. In some embodiments, the fabric is made from or containing monolayer or multilayer non-woven fabrics. In some embodiments, the non-woven fabric is multilayered and at least one layer is made from or containing fibers formed from the propylene ethylene copolymer. In some embodiments, the other layer is obtained by spinning processes other than spunbond. In some embodiments, the other layer is made from or containing other types of polymers.

In some embodiments, the tenacity in the transverse direction direction (TD) of the non-woven fabric ranges from 12.0 to 24.0 N, alternatively from 12.5 to 20 N.

In some embodiments, haptics range from 8 to 10.

The following examples are given to illustrate, not to limit, the present disclosure:

EXAMPLES

Xylene-Soluble (XS) Fraction at 25° C.

Xylene Solubles at 25° C. was determined according to ISO 16 152; with solution volume of 250 ml, precipitation at 25° C. for 20 minutes, including 10 minutes with the solution in agitation (magnetic stirrer), and drying at 70° C.

DSC Method for Melting Point

Melting point was measured according to ISO 11357-3, at scanning rate of 20 C/min both in cooling and heating, on a sample of weight between 5 and 7 mg., under inert N2 flow. The instrument was calibrated with indium.

Glass Transition Temperature Via DMTA (Dynamic Mechanical Thermal Analysis)

Molded specimens of 76 mm by 13 mm by 1 mm were fixed to a DMTA machine for tensile stress. The frequency of the tension and relies of the sample were fixed at 1 Hz. The DMTA translates the elastic response of the specimen starting from −100° C. to 130° C. The elastic response was plotted versus temperature. The elastic modulus for a viscoelastic material is defined as $E=E'+iE''$. The DMTA split the two components E' and E" by resonance, plotted E' vs temperature, and plotted E'/E"=tan (δ) vs temperature.

The glass transition temperature Tg was assumed to be the temperature at the maximum of the curve E'/E"=tan (δ) vs temperature.

Melt Flow Rate (MFR)

Measured according to ISO 1133 at 230° C. with a load of 2.16 kg, unless otherwise specified.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket, which permitted temperature control with a circulating thermostatic liquid. The downward passage of the meniscus was timed by a photoelectric device.

The passage of the meniscus in front of the upper lamp started the counter, which had a quartz crystal oscillator. The counter stopped as the meniscus passed the lower lamp, and the efflux time was registered. The efflux time was converted into a value of intrinsic viscosity through Huggins' equation (Huggins, M. L., J. Am. Chem. Soc., 1942, 64, 2716) based upon the flow time of the solvent at the same experimental conditions (same viscometer and same temperature). A single polymer solution was used to determine [11].

Ethylene Content in the Copolymers $^{13}$C NMR spectra were acquired on a Bruker AV-600 spectrometer equipped with cryoprobe, operating at 160.91 MHz in the Fourier transform mode at 120° C.

The peak of the Sββ carbon (nomenclature according to "Monomer Sequence Distribution in Ethylene-Propylene Rubber Measured by $^{13}$C NMR. 3. Use of Reaction Probability Mode" C. J. Carman, R. A. Harrington and C. E. Wilkes, Macromolecules, 1977, 10, 536) was used as an internal reference at 29.9 ppm. The samples were dissolved in 1,1,2,2-tetrachloroethane-d2 at 120° C. with an 8% wt/v concentration. Each spectrum was acquired with a 90° pulse, and 15 seconds of delay between pulses and CPD to remove $^1$H-$^{13}$C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethyl-aluminum chloride" M. Kakugo, Y. Naito, K. Mizunuma and T. Miyatake, Macromolecules, 1982, 15, 1150) using the following equations:

$$PPP = 100 \, T\beta\beta / S$$
$$PPE = 100 \, T\beta\delta / S$$
$$EPE = 100 \, T\delta\delta / S$$
$$PEP = 100 \, S\beta\beta / S$$
$$PEE = 100 \, S\beta\delta / S$$
$$EEE = 100 \, (0.25 \, S\gamma\delta + 0.5 \, S\delta\delta) / S$$
$$S = T\beta\beta + T\beta\delta + T\delta\delta + S\beta\beta + S\beta\delta + 0.25 \, S\gamma\delta + 0.5 \, S\delta\delta$$

The molar percentage of ethylene content was evaluated using the following equation:

$$E \, \% \, mol = 100 * [PEP + PEE + EEE]$$

The weight percentage of ethylene content was evaluated using the following equation:

$$E \, \% \, wt. = \frac{100 * E \, \% \, mol * MWE}{E \, \% \, mol * MWE + P \, \% \, mol * MWP}$$

where P % mol is the molar percentage of propylene content, while MWE and MWP are the molecular weights of ethylene and propylene, respectively.

The product of reactivity ratio $r_1 r_2$ was calculated according to Carman (C. J. Carman, R. A. Harrington and C. E. Wilkes, Macromolecules, 1977; 10, 536) as:

$$r_1 r_2 = 1 + \left(\frac{EEE + PEE}{PEP} + 1\right) - \left(\frac{P}{E} + 1\right)\left(\frac{EEE + PEE}{PEP} + 1\right)^{0.5}$$

The tacticity of Propylene sequences was calculated as mm content from the ratio of the PPP mmT$_{\beta\beta}$ (28.90-29.65 ppm) and the whole T$_{\beta\beta}$ (29.80-28.37 ppm).

Tenacity and Elongation at Break of Non-Woven Fabrics

Test pieces 50 mm large and about 100 mm long were obtained by cutting the non-woven fabrics, with the longer side in the Machine Direction (MD), corresponding to the direction of movement of the spun-bond conveyor belt, or in the Transverse Direction (TD), perpendicular to the Machine direction. The two opposite 50 mm sides of the sample were fixed to the clamps of an Instron dynamometer (model 1122) and tensioned to break with a crosshead speed of 100 mm/min, the initial distance between the clamps being of 100 mm. The ultimate strength (load at break) and the elongation at break were determined.

Both tenacity and elongation were measured in TD, using the respectively cut test pieces.

Example 1

Preparation of the Ziegler-Natta Solid Catalyst Component

The Ziegler-Natta catalyst was prepared as described for Example 5, lines 48-55, of European Patent No. EP728769B1.

Preparation of the Catalyst System—Precontact

Before introducing the solid catalyst component into the polymerization reactors, the solid catalyst component was contacted with aluminum-triethyl (TEAL) and dicyclopentyldimethoxysilane (D donor) under the conditions reported in Table 1.

Prepolymerization

The catalyst system was then subjected to prepolymerization treatment at 20° C. by maintaining the catalyst system in suspension in liquid propylene for a residence time of 9 minutes before introducing the catalyst system into the polymerization reactor.

Polymerization

The polymerization was carried out in gas-phase polymerization reactor including two interconnected polymerization zones, a riser and a downcomer, as described in European Patent No. EP782587. Hydrogen was used as a molecular weight regulator. The polymer particles exiting from the polymerization step were subjected to a steam treatment to remove the unreacted monomers and dried under a nitrogen flow.

The main precontact, prepolymerization and polymerization conditions and the quantities of monomers and hydrogen fed to the polymerization reactor are reported in Table 1.

TABLE 1

| Example 1 | | |
|---|---|---|
| PRECONTACT | | |
| Temperature | ° C. | 15 |
| Residence Time | min | 13 |
| TEAL/catalyst | wt/wt | 8 |
| TEAL/Ext. Donor | g/g | 4 |

TABLE 1-continued

Example 1

| PREPOLYMERIZATION | | |
|---|---|---|
| Temperature | ° C. | 20 |
| Residence Time | min | 8 |
| POLYMERIZATION | | |
| Temperature | bar-g | 65 |
| Pressure | bar-g | 24 |
| Residence Time | min | 111 |
| Split holdup riser | wt % | 40 |
| Split holdup downcomer | wt % | 60 |
| $C_2^-/C_2^- + C3^-$ riser | mol/mol | 0.012 |
| $C_2^-/C_2^- + C3^-$ downcomer | mol/mol | 0.032 |
| $H_2/C_3^-$ riser | mol/mol | 0.026 |
| $H_2/C_2^-$ downcomer | mol/mol | 0.186 |

$H_2$ = hydrogen;
$C_2^-$ = ethylene,
$C_3^-$ = propylene

The resulting polymer had an MFR of 2.11 g/10 min and was visbroken to MFR 27.8 g/10 min. Properties of the visbroken polymer are reported in Table 2.

TABLE 2

| Ex | | 1 |
|---|---|---|
| Ethylene content | Wt % | 7.6 |
| Xylene soluble at 25° C. | Wt % | 17.5 |
| Intrinsic viscosity xylene solubles | dl/g | 1.56 |
| MFR | g/10 min | 27.8 |
| Ethylene in the fraction insoluble in xylene at 25° C. | Wt % | 4.35 |
| Ethylene in the fraction soluble in xylene at 25° C. | Wt % | 24.40 |
| PEP sequences in the fraction insoluble in xylene at 25° C. | Mol % | 3.94 |
| PEP sequences in the fraction soluble in xylene at 25° C. | Mol % | 12.25 |
| PEE sequences in the fraction soluble in xylene at 25° C. | Mol % | 12.89 |
| EEE sequences in the fraction soluble in xylene at 25° C. | Mol % | 8.98 |
| $r_1r_2$ in the fraction insoluble in xylene at 25° C. | | 4.83 |
| Melting point | ° C. | 142.4 |

Production of Non-Woven Fabric Examples 2 and 3 and Comparative Example 4.

Non-woven fabrics made of concentric skin-core composite filaments were prepared.

In Example 2, skin and core were made with the polymer of Example 1; in Example 3, the skin was made with the polymer of Example 1 and the core was made from Moplen HP561R homopolymer, which was commercially available from LyondellBasell In Comparative Example 4, the skin was made with Hostalen GX5052 high density polyethylene (which was commercially available from LyondellBasell) and the core was made with Moplen HP561R homopolymer (which was commercially available from LyondellBasell).

The polymer materials, were fed to a Reicofil 4 spunbond pilot line, which was run with the following settings and operative conditions:
core/skin 70/30 (whole diameter: 0.6 mm);
line speed (m/min): 214 (17 gsm*)-73 (50 gsm);
spinneret: 7377 holes (6827 holes/m);
gap pre-diffusor (exit): 23 mm;
Secondary air gap—right/left: 14 mm;
gap diffusor exit: 75 mm; and
distance above the belt right/left: 131 mm.
gsm=grams per square meter.

The thermal bonding was carried out with the hot rolls at the temperatures reported in Table 3.

The non-woven fabrics were made of composite filaments with concentric core and skin structure in a weight ratio of 70% of core and 30% of skin.

The mechanical properties of the non-woven fabrics are reported in Table 3.

TABLE 3

| Example | | Ex. 2 | Ex3 | Comp Ex. 4 |
|---|---|---|---|---|
| Skin | | Ex 1 | Ex 1 | GX5052 |
| Core | | Ex 1 | HP561R | HP561R |
| Thermal bonding temperature | [° C.] | 123 | 123 | 123 |
| Non-woven properties | | | | |
| Tenacity TD | [N] | 13.0 | 18.8 | 11.4 |
| haptics | | 10 | 8 | 10 |

Note:
TD = Transverse Direction

Haptics:

Textile specimens were assessed by a panel of 25 evaluators. Textile materials in foils with dimensions of 40 cm×40 cm were used. The specimens were identified with a code (anonymous), which did not reflect the name of the parent material. Each specimen was used for one evaluation for each member of the panel.

Two fabric extremes for the characteristic of interest were chosen and, to such specimen extremes, arbitrary numerical values were assigned (a scale from 0 to 10). Specimens to be evaluated were then assigned values within the established numerical scale, according to the differences felt.

Kendall coefficient of concordance W was used to check if the concordance among the evaluators were acceptable. using the following formula $$W = \frac{12 \cdot \left[\sum_{j=1}^{n} (R_j - \overline{R})^2\right]}{r^2 n(n-1)(n+1)}$$

where $R_j$ was the sum of ranks given to each fabric sample; P was the mean value of rank sum; r is the number of evaluators and n is the number of specimens. When the value of W is greater of 0.61, the concordance among the evaluators was considered acceptable.

The features evaluated were the following:

| Characteristic | Definition | Subjective assessment technique |
|---|---|---|
| Hardness/Softness | Resistance of compression | Compress the sample with the hands. |
| Flexibility/Dropability | Resistance to bending. The floppier the sample and the closer the sample followed the lines of the knuckles, the more flexible the sample was considered. | Get the sample between the thumb and index fingers so that sample drapes down across the knuckles. Flip the sample to and from one side of the hand and the other. |

-continued

| Characteristic | Definition | Subjective assessment technique |
|---|---|---|
| Smoothness | The surface of smooth fabric offers little resistance to slipping when rubbed. | Take the fabric between two fingers of both hands and pull the fabric by one hand so that the fabric slides between two fingers. |

An average of the evaluations was calculated.

What is claimed is:

1. A fiber comprising:
   a propylene ethylene copolymer having:
   i) a xylene soluble fraction at 25° C. ranging from 14 wt % to 27 wt %, based upon the total weight of the propylene ethylene copolymer;
   ii) an intrinsic viscosity of the fraction soluble in xylene at 25° C. ranging from 1.0 to 2.4 dl/g;
   iii) a melt flow rate, MFR, measured according to ISO 1133 at 230 ° C. with a load of 2.16 kg, ranging from 12 g/10 min to 60.0 g/10 min;
   iv) an ethylene derived units content ranging from 5.0 wt % to 12.0 wt %, based upon the total weight of the propylene ethylene copolymer;
   v) the ethylene derived units content of the fraction insoluble in xylene at 25° C. ranging from 2.5 wt % to 6.0 wt %;
   vi) the ethylene derived units content on the fraction soluble in xylene at 25° C. ranging from 15.2 wt % to 30.2 wt %;
   vii) $C^{13}$ NMR sequences PEP measured on the fraction insoluble in xylene at 25° C. ranging from 3.5 mol % to 5.5 mol %; and
   viii) $C^{13}$ NMR sequences PEP measured on the fraction soluble in xylene at 25° C. ranging from 11.0 mol % to 14.2 mol %.

2. The fiber according claim 1, wherein, in the propylene ethylene copolymer, the melt flow rate, MFR, measured according to ISO 1133 at 230° C. with a load of 2.16 kg, ranges from 15.0 g/10 min to 50.0 g/10 min.

3. The fiber according to claim 1, wherein, in the propylene ethylene copolymer, the xylene soluble fraction at 25° C. ranges from 17 wt % to 25 wt %.

4. The fiber according to claim 1, wherein, in the propylene ethylene copolymer, the intrinsic viscosity of the fraction soluble in xylene at 25° C. ranges from 1.5 to 2.2 dl/g.

5. The fiber according to claim 1, wherein, in the propylene ethylene copolymer, the melt flow rate, MFR, measured according to ISO 1133 at 230° C. with a load of 2.16 kg, ranges from 18.6 g/10 min to 30.0 g/10 min.

6. The fiber according to claim 1, wherein, in the propylene ethylene copolymer, the $C^{13}$ NMR sequences PEP measured on the fraction insoluble in xylene at 25° C. ranges from 3.8 mol % to 5.2 mol %; and the $C^{13}$ NMR sequences PEP measured on the fraction soluble in xylene at 25° C. ranges from 11.5 mol % to 13.8 mol %.

7. The fiber according to claim 1, wherein, in the propylene ethylene copolymer, the $C^{13}$ NMR sequences PEP measured on the fraction insoluble in xylene at 25° C. ranges from 3.9 mol % to 4.8 mol %; and the $C^{13}$ NMR sequences PEP measured on the fraction soluble in xylene at 25° C. ranges from 12.3 mol % to 13.5 mol %.

8. The fiber according to claim 1, wherein, in the propylene ethylene copolymer, the ethylene derived units content of the fraction insoluble in xylene at 25° C. ranges from 3.2 wt % to 5.2 wt %.

9. The fiber according to claim 1, wherein, in the propylene ethylene copolymer, the ethylene derived units content of the fraction soluble in xylene at 25° C. ranges from 17.2 wt % to 24.8 wt %.

10. The fiber according to claim 1, wherein, in the propylene ethylene copolymer, the $C^{13}$ NMR sequences PEE measured on the fraction soluble in xylene at 25° C. range from 7.2 mol % to 12.0 mol %.

11. The fiber according to claim 1, wherein, in the propylene ethylene copolymer, the $C^{13}$ NMR sequences EEE measured on the fraction soluble in xylene at 25° C. are lower than 6.5 mol %.

12. The fiber according to claim 1, wherein, in the propylene ethylene copolymer, the product of reactivity ratio r1r2 of the fraction insoluble in xylene at 25° C. measured with $C^{13}$ NMR is between 2.4 and 4.6.

13. The fiber according to claim 1 comprising a skin-core structure wherein the skin, the core, or both of the fiber comprise the propylene ethylene copolymer.

14. The fiber according to claim 13, wherein both the skin and core of the fiber comprise the propylene ethylene copolymer .

15. Non-woven fabrics comprising a fiber according to claim 1.

* * * * *

UNITED STATES PATENT AND TRADEMARK OFFICE
CERTIFICATE OF CORRECTION

PATENT NO. : 11,840,775 B2
APPLICATION NO. : 17/617325
DATED : December 12, 2023
INVENTOR(S) : De Palo et al.

It is certified that error appears in the above-identified patent and that said Letters Patent is hereby corrected as shown below:

In the Specification

Column 1, Line 29, after "resistance" add -- . -- and move "SUMMARY OF INVENTION" to new line, therefor Column 6, Line 54, delete "E'/E" = tan (8)" and insert -- $E'/E$" = tan ($\delta$) --, therefor Column 6, Line 56, delete "E'/E" = tan (8)" and insert -- $E'/E$" = tan ($\delta$) --, therefor Column 7, Line 9, delete "[11]" and insert -- [$\eta$] --, therefor Column 7, Line 14, delete "Sop" and insert -- S$\beta\beta$ --, therefor Column 10, Line 50, delete "P" and insert -- $\bar{R}$ --, therefor Signed and Sealed this
Twenty-first Day of January, 2025

Coke Morgan Stewart
*Acting Director of the United States Patent and Trademark Office*